3,479,287
DRILLING FLUIDS AND ADDITIVES THEREFOR
James C. Floyd, Alvin, Tex., and Francis J. Shell, Bartlesville, Okla., assignors to Phillips Petroleum Company, a corporation of Delaware
No Drawing. Filed Sept. 30, 1965, Ser. No. 491,830
Int. Cl. E21b *21/04;* C10m *3/32, 3/04*
U.S. Cl. 252—8.5                                     19 Claims

ABSTRACT OF THE DISCLOSURE

An aqueous drilling fluid to which has been added a first agent which is a sulfoalkylated tannin in the form of its alkali metal or ammonium salt or a heavy metal or aluminum complex thereof and a second agent selected from water soluble inorganic compounds of chromium, aluminum, vanadium, titanium, zinc, and manganese, said agents being added to control at least one of the yield point, gel strength, and water loss of the drilling fluid.

---

This invention relates to drilling fluids and additives therefor. In one aspect this invention relates to drilling fluids having improved water loss properties and/or improved viscosity or other rheological characteristics. In another aspect this invention relates to additives for drilling fluids, which additives when incorporated in a drilling fluid impart improved water loss properties and/or viscosity or other rheological characteristics to said drilling fluid.

In the art of drilling wells to tap subterranean deposits of fluids such as oil and/or gas, especially when drilling by the rotary method employing a rotary bit and drill stem, a drilling fluid, usually a compounded fluid made to predetermined physical and chemical properties, is circulated to the bottom of the bore hole, out through openings in the bit at the bottom of the bore hole, and then back up said bore hole to the surface by passage through the annular space between said drill stem and the wall of said bore hole (or between said drill stem and the wall of the casing where casing has been put in place).

The drilling fluid must act as a liquid medium of controlled viscosity for removing cuttings from the bore hole; it must prevent excessive amounts of fluid from flowing from the bore hole into surrounding formations by depositing on the wall of the hole a thin but substantially impervious filter cake; it must possess a gel structure of sufficient strength to hold in suspension solids, particularly during any time the fluid is not circulating; and it must serve as a weighting material exerting sufficient pressure to counterbalance any pressure exerted by water, gas, oil, or other fluid from a penetrated structure and to prevent caving or other intrusion into the drill hole.

These requirements have been met in the past by employing both aqueous or water base and non-aqueous or oil base drilling fluids. The aqueous drilling fluids normally comprise water, and finely divided inorganic materials such as various types of clays and clayey materials, and may also contain weighting materials, all suspended in the water. The non-aqueous or oil base drilling fluids normally comprise a non-aqueous liquid such as crude oil or a petroleum distillate, and a weighting material which can be a clay or other suitable material. In addition to aqueous and non-aqueous drilling fluids as defined above, emulsion-type drilling fluids are often used. These emulsion drilling fluids normally comprise a substantially water-insoluble liquid such as oil, a finely divided inorganic material such as clay, and water, together with a suitable dispersing or emulsifying agent. The two types of emulsion drilling fluids are the oil-in-water emulsion type, sometimes referred to as water base emulsion type, and the water-in-oil emulsion type, sometimes referred to as oil base emulsion type. In the latter, oil forms the continuous phase of the emulsion, and in the former, water or brine forms the continuous phase of the emulsion.

In the drilling of wells there are major difficulties caused by natural formations penetrated. One of these difficulties is the encountering of certain formations, such as gypsum, which will "cut" the drilling mud so that the clay particles are flocculated and the viscosity becomes too high. In such instances there is danger of the drill pipe twisting in half, or of gas cutting of the mud, or of a blowout occurring due to the cutting of the mud. Another difficulty is the encountering of formations known as heaving shale. A heaving shale absorbs water from the drilling mud and by a caving or disintegrating action common to clay and shale, or by a swelling action common to bentonite materials, the well hole is closed around the drill string, choking off the circulation of drilling mud and often seizing the drill string so that it cannot be rotated or twists in half. Another difficulty which is frequently encountered in deeper wells is gelation and/or thickening of the drilling mud due to the higher temperatures encountered in said deeper wells. In such instances the drilling mud actually gels and/or thickens, greatly increasing the pump pressures required for circulating the drilling mud. In severe cases it becomes practically impossible to properly circulate the mud. Furthermore, said high temperature gelation is frequently aggravated by the presence of contaminants such as gypsum, salt, cement, etc. in the drilling mud. Thus, another requirement for drilling muds is that they be characterized by stability and the higher temperatures encountered in deeper wells.

We have now discovered a new class of additives for drilling fluids, which additives when incorporated in aqueous drilling fluids, e.g., water base drilling fluids and oil-in-water emulsion drilling fluids, impart enhanced water loss properties and/or enhanced viscosity or other rheological characteristics to said drilling fluids. Said new additives are combination additives comprising an additive Agent No. 1, e.g., a sulfoalkylated tannin or a metal complex of a sulfoalkylated tannin, and an additive Agent No. 2, e.g., the water-soluble cationic and anionic compounds of certain amphoteric metals.

Thus, broadly speaking, the present invention resides in said new additives; drilling fluids containing one or more of said new additives; and methods of using said drilling fluids in the drilling of wells.

Thus, an object of this invention is to provide an improved drilling fluid. Another object of this invention is to provide an improved drilling fluid having enhanced water loss properties and/or enhanced viscosity or other rheological characteristics. Another object of this invention is to provide improved aqueous drilling fluids which are characterized by stability to the high temperatures encountered in drilling deep wells. Another object of this invention is to provide new additives for use in aqueous drilling fluids, e.g., water base drilling fluids and oil-in-water emulsion drilling fluids, which additives will impart enhanced water loss properties and/or enhanced viscosity or other rheological characteristics to said drilling fluids. Another object of this invention is to provide methods of using said improved drilling fluids in the drilling or workover of wells. Other aspects, objects, and advantages of the invention will be apparent to those skilled in the art in view of this disclosure.

Thus, according to the invention, there is provided an aqueous drilling fluid comprising water, and sufficient finely divided solids to form a filter cake on the wall of the well, and to which there has been added: a first agent selected from the group consisting of (1) a sulfoalkylated tannin and (2) a metal complex of a sulfoalkylated tannin wherein said metal is selected from the group consisting of iron, copper, chromium, nickel, cobalt, manganese, zinc, aluminum, titanium vanadium, and mixtures thereof; and a second agent selected from the group consisting of the water-soluble cationic and anionic compounds of chromium, aluminum, vanadium, titanium, zinc, manganese, and mixtures thereof; the weight ratio of said first agent to said second agent being within the range of from 20:1 to 1:1; and the total amount of said first agent and said second agent added to said drilling fluid being an amount sufficient to reduce at least one of (a) the water loss due to filtration through said filter cake, (b) the yield point, and (c) the 10-minute gel of said drilling fluid but insufficient to increase the viscosity of said drilling fluid to such an extent that it cannot be circulated.

Further according to the invention, there are provided methods of using the improved well drilling fluids of the invention, which methods comprise circulating said well drilling fluids into and from the bore hole in contact with the wall of said bore hole.

Still further according to the invention, there is provided a drilling fluid additive comprising a mixture of a first agent selected from the group consisting of (1) a sulfoalkylated tannin and (2) a metal complex of a sulfoalkylated tannin wherein said metal is selected from the group consisting of iron, copper, chromium, nickel, cobalt, manganese, zinc, aluminum, titanium vanadium, and mixtures thereof; and a second agent selected from the group consisting of the water-soluble cationic and anionic compounds of chromium, aluminum, vanadium, titanium, zinc, manganese, and mixtures thereof; the weight ratio of said first agent to said second agent in said additive being within the range of from 20:1 to 1:1.

It will be noted that the drilling fluid additives of the invention are combination additives, i.e., said additives comprise a mixture of an additive Agent No. 1 and an additive Agent No. 2 which cooperate to obtain the improved result of the invention. Said combination additives cooperate in a synergistic manner to impart reduced water loss properties, reduced yield point values, and reduced gel values, or other improved rheological properties to a drilling fluid having the combination additive incorporated therein. The synergistic effect obtained when said additive agents of the combination additive of the invention are used in combination is discussed further hereinafter in connection with the specific examples.

Said additive Agent No. 1 of the combination additive can be either a sulfoalkylated tannin or one or more of certain metal complexes of a sulfoalkylated tannin. The sulfoalkylated tannins, e.g., sulfomethylated quebracho, are presently preferred for use as said additive Agent No. 1. Said additive Agent No. 2 of the combination additive of the invention is selected from the group consisting of the water-soluble cationic and anionic compounds of chromium, aluminum, vanadium, titanium, zinc, manganese, and mixtures thereof. The ammonium, sodium, and potassium chromates and dichromates are presently preferred for use as additive Agent No. 2.

The metal complexes of sulfoalkylated tannins which can also be used as Agent No. 1 in the additives of the invention are preferably those which are soluble in the water phase of the drilling fluid. However, as discussed further hereinafter, the invention is not limited to the metal complexes of sulfoalkylated tannins which are completely soluble in water. It is sufficient if said metal complexes can be readily dispersed in the water phase of the drilling fluids in any suitable manner. Said metal complexes per se, methods for preparing same, and drilling fluid compositions containing the same, are disclosed and claimed in copending application Ser. No. 258,888, filed Feb. 15, 1963, now abandoned, and copending application Ser. No. 491,837, filed Sept. 30, 1965, by C. A. Stratton, now Patent 3,344,063, issued Sept. 26, 1967. As shown in the examples given hereinafter, the present invention is an improvement over the inventions of said copending applications.

Examples of metal compounds which can be used as the complexing metal reagent in the preparation of said metal complexes, include, among others, the water-soluble salts such as the nitrate or chloride, and the hydroxides or hydrated oxides of iron, copper, chromium, nickel, cobalt, manganese, zinc, aluminum, titanium, and vanadium. Generally speaking, the water-soluble salts are preferred. However, the hydrated oxides or hydroxides of said metals are sometimes preferred compounds because they contain no anions such as chloride or nitrate which would be left in the reaction mixture when the cation is complexed with the tannin. Another preferred class of metal-containing compounds which can be used are the ammonium and the alkali metal salts of the above metals wherein the said above metals are present in the anion portion of the molecule, e.g., the alkali metal chromates, vanadates, titanates, manganates, etc., and the alkali metal dichromates. As used herein and in the claims, unless otherwise specified, the term alkali metal is employed generically to include sodium, potassium, lithium, rubidium, cesium, and ammonium.

Tannins which can be used in preparing the sulfoalkylated tannins and the metal complexes of sulfoalkylated tannins used in the practice of the invention are the vegetable tannins, including both the gallotannins and the flavotannins (sometimes called catechol tannins). Thus, the word "tannin" as used herein and in the claims, unless otherwise specified, refers to and includes the vegetable gallotannins and the vegetable flavotannins. Examples of the gallotannins include: tannic acid or Chinese tannin; Turkish tannin; Hamamelis tannin; Acer-tannin; Glucogallin; Sumac tannin; Valonia oak gall tannin; tea tannin; Tara; Myrabolam; Divi-Divi; Algarobillo; oak; and chestnut. Examples of flavotannins include: Gambier and Catechu or Burma Cutch; quebracho; Tizerah; Urunday; wattle; mangrove; spruce; hemlock; larch; willow; and Avaram. Said flavotannins are the presently preferred tannins for use in accordance with the invention.

Quebracho is the presently most preferred tannin. Quebracho is extracted from the bark and wood of the quebracho tree with water. The conventional method of preparing quebracho is to disintegrate the wood and bark, extract the bark and/or wood with water, the solution of quebracho and water is evaporated to 85 percent concentration of quebracho and the concentrated quebracho is spray dried. Quebracho is the commercial catechol tannin or flavotannin product. The high tannin content (about 20 percent) of the wood of the quebracho tree makes it the important source of catechol tannins. The principal source of gallotannins is gall nuts.

As indicated above, the sulfoalkylated tannins, e.g., sulfomethylated quebracho, are presently preferred for use as Agent No. 1 in the combination additives of the invention. As will be understood by those skilled in the art in view of this disclosure, the following description of methods (including reaction conditions) for preparing metal complexes of sulfoalkylated tannins also applies to the preparation of the sulfoalkylated tannins. The only difference is that no complexing metal reagent is used.

The metal complexes of sulfoalkylated tannin, either a gallotannin or a flavotannin, can be prepared by several different procedures. All of said procedures involve the inter-reaction, in an alkaline aqueous reaction medium under reaction conditions, between a tannin compound, a carbonyl compound selected from the group consisting of aldehydes and ketones, a sulfur compound selected from the group consisting of sulfurous acid and water-soluble salts thereof, and a metal compound selected from the group consisting of the hydrated oxides or hydroxides and the water-soluble salts of iron, copper, chromium, nickel, cobalt, manganese, zinc, aluminum, titanium, and vanadium. Thus, in one method an alkali metal hydroxide, e.g., sodium hydroxide, an aldehyde of ketone, e.g., formaldehyde or acetone, a sulfite, e.g., sodium sulfite or sodium bisulfite, a tannin, e.g., quebracho (quebracho extract), and a suitable metal compound e.g., a ferric salt, are added to water in a reaction vessel to form a reaction mixture. The sequence of adding said reactants to the water is not critical. However, it is sometimes preferred to add the alkali metal hydroxide first. The amount of alkali metal hydroxide employed will be an amount sufficient to make the reaction mixture alkaline, at least initially. Said reaction mixture is then maintained under conditions of time and temperature sufficient to cause the substantial conversion of the tannin compound into a metal complex of sulfoalkylated tannin.

If desired, the carbonyl compound, e.g., formaldehyde or acetone, and the sulfite can be prereacted. Thus, in one method, for example, a solution containing formaldehyde and sodium sulfite is prepared separately and then combined with the other reactants in the alkaline reaction medium.

In one preferred method for preparing said metal complexes, an alkaline first solution is prepared by dissolving a tannin (such as quebracho extract), and an alkali metal hydroxide (such as sodium hydroxide) in water. A second solution is formed by admixing a carbonyl compound (such as formaldehyde) and a sulfite (such as sodium bisulfite) in water. Said second solution is then added to said first solution to form a third solution. Said third solution is then maintained at an elevated temperature for a period of time sufficient for at least a substantial portion of said aldehyde and said sulfite to react with said tannin to form a sulfoalkylated tannin. A metal compound (such as ferric sulfate) is then added to said third solution and reacted with the sulfoalkylated tannin therein to form a metal complex of sulfoalkylated tannin which is recovered from the resulting reaction mixture. In this instance, using the exemplary reactants mentioned above, the product is an iron complex of sulfomethylated quebracho.

In another preferred method for preparing the metal complexes of the invention, the desired amount of water is added to a reactor vessel equipped with suitable stirring means. The desired amount of carbonyl compound (such as formaldehyde) is then added to said water with stirring. The desired amount of a sulfite (such as sodium bisulfite) is then added to the water, with stirring, and the carbonyl compound and sulfite are permitted to react to completion. Usually the reaction time will be within the range of 0.5 to 3 hours and the final temperature will be in the order of 125° F., depending upon the initial ambient temperature of the water, the amount of reagents, etc. The desired amount of an alkali metal hydroxide (such as sodium hydroxide) is then added. The tannin compound (such as quebracho) is then added to the tank containing the above reagents with vigorous stirring. Heating is initiated and the solution is maintained at an elevated temperature which is preferably within the range of 180 to 200° F. for a period of from 1 to 6 hours. The desired amount of a metal compound is then added to the solution of sulfoalklyated tannin and reacted therewith to form a metal complex of sulfoalkylated tannin. It is not necessary to add additional heat to the reactant solution during the addition of the metal compound. The residual heat remaining from dissolving the tannin compound will usually be sufficient. After the sulfoalkylation reaction is complete the metal complex of solfoalkylated tannin is recovered from the reaction solution in any suitable manner, such as by drum drying, or spray drying.

If desired, the metal can be complexed with the tannin compound first. In this method, the metal compound is added to an alkaline solution of the tannin to form the metal complex of said tannin. Said metal complex is then sulfoalkylated by adding the carbonyl compound and sulfite, either prereacted or not prereacted, to the solution of the metal complex of the tannin to sulfoalkylate said metal complex and form a metal complex of sulfoalkylated tannin.

In all of the above methods, the metal complexes of sulfoalkylated tannin can be recovered from the reaction mixture by any suitable method such as evaporation, drum drying, spray drying, etc. It is not essential to recover said metal complexes of sulfoalkylated tannin from the reaction mixture. Said reaction mixture can be used per se in liquid form in the drilling fluids of the invention. However, it is preferred to recover and dry said metal complex products. The dried solids can then be bagged and shipped to the field for use in the drilling muds described herein.

The vegetable tannins are high molecular weight materials having molecules of complex structure containing phenolic hydroxyl groups. Some authorities consider said tannins to be mixtures of polyphenolic substances. So far as is known all of said tannins contain at least one aromatic (e.g., benzene) ring having at least one phenolic hydroxyl group attached thereto. Said hydroxyl groups have their hydrogen atoms replaced in alkaline solution. It is believed the hydroxyl groups furnish at least a portion of the reactive sites for complexing an atom of a metal such as iron with the tannin molecule. The reactive sites remaining on the aromatic ring structure are susceptible to sulfoalkylation to add side chain(s) to the tannin molecule.

Due to the complex nature and chemistry of the tannin compounds it is not intended to limit the invention to the above or to any specific reaction mechanism, or to any specific method for preparing the sulfoalkylated tannins or metal complexes thereof which are used as Agent No. 1 in the additives of the invention. However, said sulfoalkylated tannins and metal complexes thereof can be conveniently described in terms of processes for their manufacture. One reaction mechanism by which said metal complexes of sulfoalkylated tannin can be formed is as follows. Two reactions, which can be carried out simultaneously or in any order, are involved; (1) a metal complexing reaction whereby an atom of the metal involved complexes with one, two, or three tannin molecules and (2) a sulfoalkylation reaction whereby the tannin molecule is alkylated by one or more sulfoalkylation radicals attached to said tannin molecule as side chains. The alkylene portion of said sulfoalkylene radical is a methylene or substituted methylene group. Thus, said side chain(s) can be represented by the formula

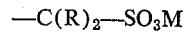

wherein each R is selected from the group consisting of a hydrogen atom and alkyl, cycloalkyl, aryl, and alkaryl radicals, and M is ammonium or an alkali metal depending upon the particular sulfite employed. As indicated hereinafter, it is preferred when R is other than hydrogen, that said R be an alkyl group containing from 1 to 5 carbon atoms.

As indicated above, the reactions involved in the preparation of the sulfoalkylated tannins and metal complexes of sulfoalkylated tannin used in the practice of the invention are carried out in an alkaline aqueous medium. Hydroxides of the alkali metals sodium, potassium, lithium, rubidium, and cesium can be used to make said medium alkaline. The amounts of said hydroxides used can be varied over a wide range. The principal function of said hydroxide is to impart sufficient initial solubility to the raw tannin so that it can react with the sulfite and aldehyde or ketone reactants and the metal compound in the sulfoalkylation and metal complexing reactions. In order to obtain practical reaction rates for said reactions, the pH of the reaction medium should be about 10. In any event, enough of the hydroxide is used to make the initial pH of the reaction medium at least 7, and preferably 10 to 13. However, large excesses of the hydroxide above the amount required to initially solubilize the raw tannin should be avoided for best results. After the tannin has been sulfoalkylated it is not necessary that the reaction medium be alkaline. Depending upon the particular metal compound used to supply the complexing metal, the final reaction mixture can have a pH of less than 7. When sulfurous acid and a bisulfite are used as the sulfur compound, sufficient hydroxide should be present to convert these to the sulfite form. If desired, the alkali metal hydroxide can be prereacted with the tannin prior to the addition of the other reactants to the reaction medium.

Carbonyl compounds which can be used in preparing said sulfoalkylated tannins and metal complexes thereof include any aldehyde or ketone containing a $>C=O$ group, the carbon atom of which is capable of becoming a methylene or substituted methylene group. Thus, aldehydes and ketones which can be used can be represented by the formula $(R)_2C=O$ wherein R is as defined above. Since said R is non-functional in the reaction, there is no real limit on what it is or the number of carbon atoms which it contains. However, when R is unduly large, solubility problems in the aqueous reaction medium and also in connection with the solubility of the reaction product are encountered. The larger R groups tend to make the product hydrophobic. In general, this is undesirable when the products are used in the additives of the invention. Thus, since it is preferred to carry out the reaction in an aqueous medium, it is preferred as a practical matter that when R is not hydrogen, it is an alkyl group containing from 1 to 5 carbon atoms, more preferably 1 to 3 carbon atoms.

Examples of said preferred aldehydes and ketone include:

formaldehyde
acetaldehyde
propionaldehyde
n-butyraldehyde
isobutyraldehyde
n-valeraldehyde
acetone
methyl ethyl ketone
diethyl ketone
methyl n-propyl ketone
methyl isopropyl ketone.

The sulfur compound used in preparing said sulfoalkylated tannins and metal complexes thereof is, in general, sulfurous acid and its water-soluble salts such as the alkali metal salts and including the ammonium salts. The alkali metal (as defined above) sulfites are preferred. It is pointed out that when a bisulfite or sulfurous acid is added to the alkaline reaction medium, it will be converted to a sulfite. Therefore, herein and in the claims, unless otherwise designated, the term "sulfite" is employed generically to include sulfurous acid and bisulfites which, when added to the alkaline reaction medium, will be converted to and react as sulfites.

The amounts of the above-described reactants which are used are not critical. So long as a significant amount of each of said reactants is present, the desired reactions will proceed to some extent and some yield of sulfoalkylated tannin or metal complex of sulfoalkylated tannin, depending upon whether a complexing metal is used, will be obtained. The amounts of each reactant used will depend upon the amount, the kind of tannin, and the percentage of conversion of said tannin which is desired. For results approaching the optimum, it is preferred to use amounts of said reactants which are within the range of from 0.5 to 1.5 times the stoichiometric equivalent amount of each reactant which is required to completely react the tannin. Amounts of said reactants which are less than stoichiometric result in less than 100 percent conversion. Amounts in excess of stoichiometric result in a waste of material. Thus, it is preferred to use substantially stoichiometric equivalent amounts of said reactants. For example, the amount of sulfite and aldehyde or ketone is preferably the stoichiometric equivalent amount required in the sulfoalkylation reaction. When the aldehyde or ketone and the sulfite are prereacted, they are preferably prereacted in stoichiometric equivalent amounts. The amount of the iron or other metal compound used in the complexing reaction is preferably an amount which is stoichiometrically equivalent to that required to completely complex the tannin.

From the above it is seen that specific numerical ranges for the amounts of said reactants will be of only limited value in teaching this invention and it is to be understood the invention is not limited to any such specific numerical ranges. Those skilled in the art can readily determine from a few pilot experiments the stoichiometric amounts of reactants required for the particular tannin being reacted. However, as an aid to those less skilled in the art, the following ranges, based upon the specific examples given hereinafter are set forth.

TABLE I

[Amounts of Reagents Per 100 lbs. of Tannin]

| Reagent | Broad Range, lbs. | Preferred Range, lbs. | Preferred range for Quebracho, lbs. |
|---|---|---|---|
| Alkali metal hydroxide | 5 to 60 | 10 to 20 | 12 to 18. |
| Sulfite | 4 to 115 | 20 to 70 | 35 to 65. |
| Aldehyde or ketone | 1 to 60 | 5 to 50 | 15 to 36. |
| Complexing metal:[1] | | | |
| Fe | 1 to 56 | 10 to 26 | 6 to 20. |
| Cu | 1.5 to 64 | 18 to 46 | 6.5 to 21. |
| Zn | 1.5 to 65 | 18 to 46 | 6.7 to 22. |
| Cr | 0.8 to 52 | 9 to 28 | 5.8 to 17. |
| Ni | 1 to 59 | 9 to 28 | 6.5 to 20. |
| Co | 1 to 58 | 9 to 28 | 6.5 to 19. |
| Mn | 1 to 55 | 9 to 28 | 6 to 18. |
| Ti | 0.8 to 48 | 7 to 30 | 5.3 to 16. |
| V | 0.9 to 51 | 7 to 30 | 5.8 to 17. |
| Al | 0.3 to 27 | 4 to 12 | 3 to 9. |
| All above metals | 0.3 to 64 | 4 to 46 | 3 to 22. |

[1] Calculated as the metal.

The above preferred amounts of reactants can be stated in other ways. For example, in working with the amounts shown in the above Table I, the preferred amount of complexing metal (calculated as the metal) to be added to the sulfoalkylated tannin is in the range of from $\frac{1}{20}$ to 3, preferably $\frac{1}{20}$ to 1, more preferably $\frac{1}{6}$ to $\frac{5}{6}$, mols of metal per monomer mol of active ingredient in the particular tannin compound being used. In other words, it is preferred that no excess metal be present in the reaction mixture at the conclusion of the metal complexing reaction. For example, when quebracho extract is the tannin being used, quebracho catechin is considered to be the active ingredient of the quebracho. Based on a molecular weight of 274 for said quebracho catechin, 100 pounds of quebracho extract will contain an average of 0.33 pound mol of quebracho catechin, and the preferred range of reagents given in column 3 of the above Table I has been established on this basis. When other tannin materials are used, the molecular weight of the active ingredient thereof, as well as the amount contained per 100 pounds of tannin, may be different. Thus, it is desirable that the quantities of reagents to be used be established for each particular tannin material used. Those skilled in the art will have no difficulty establishing the amounts of reagents to use in view of this disclosure. Any large deviation from the 0.33 mol of active ingredient in any individual lot of quebracho extract would also require an adjustment of the chemicals used for reacting with said quebracho. However, analyses of six commercially available quebracho extracts available from different sources has shown that commercial quebracho extract is surprisingly uniform in composition.

The amount of carbonyl compound, e.g., formaldehyde, and the amount of sulfite compound, e.g., sodium bisulfite, used in the reaction will determine the amount of sulfoalkylation of the tannin compound which occurs. This affords another way of expressing the amount of carbonyl compound and sulfite. The amount of sulfoalkylation which occurs in any given reaction situation can be expressed in terms of the parts by weight of the carbonyl compound-sulfite addition product or sulfoalkylation reagent, e.g., $NaSO_3CH_2OH$—formed by reacting stoichiometric amounts of formaldehyde and sodium bisulfite, used per 200 parts by weight of tannin. For example, expressed in this manner and when using formaldehyde, sodium bisulfite, and quebracho, the most preferred amounts of sodium formaldehyde bisulfite addition product will be within the range of from 50 to 175 parts by weight of the sulfomethylation reagent per 200 parts by weight of quebracho.

In general, the reaction conditions are not critical. All the reactions involved in preparing said sulfoalkylated tannins and metal complexes thereof will take place at ordinary room temperatures (70–80° F.) but at a reduced rate and all reaction conditions at which the reactions will take place are within the scope of the invention. However, as a practical matter, it is preferred to employ elevated temperatures to cause said reactions to take place in less time. Any suitable temperature below the decomposition temperature of the tannin can be employed. For example, the application of heat aids in dissolving quebracho in the alkaline medium. As a general rule, temperatures in the order of 125 to 212° F. are sufficient. However, usually a more preferred range is from 180 to 212° F. If desired, the reaction mixture can be refluxed at atmospheric pressure, or can be heated in an autoclave under superatmospheric pressure to obtain higher temperatures. In general, the maximum temperatures employed will be in the order of 300° F. Thus, an over-all numerical range for the reaction temperatures can be said to be from 70 to 300° F.

The reaction time will be dependent upon the reaction temperature employed. Reaction times in the order of 0.5 to 10 hours have been found quite sufficient. Preferably, the reaction times will be within the range of 1 to 6, more preferably 1 to 4, hours.

Metal compounds which can be used as additive Agent No. 2 in the combination additive of the invention are the water-soluble cationic and anionic compounds of the amphoteric metals chromium, aluminum, vanadium, titanium, zinc, and manganese. As used herein and in the claims, unless otherwise specified, a cationic compound of a metal is defined as a compound wherein one of said amphoteric metals is present in the cationic portion of the molecule and an anionic compound of a metal is defined as a compound wherein one of said amphoteric metals is present in the anionic portion of the molecule. Examples of said compounds include, among others, the simple salts such as the nitrates, chlorides, iodides, bromides, sulfates, etc. of said metals. Also included are the double salts such as potassium tetrachlorozincate-aluminum sulfate, sodium chromium II sulfate hexahydrate, potassium manganese II chloride hexahydrate, sodium manganese II chloride, sodium vanadium sulfate hexahydrate, zinc ammonium chloride, zinc sodium chloride, and sodium zinc sulfate hexahydrate; alums such as potassium aluminum sulfate dodecahydrate; potassium chromium sulfate dodecahydrate, and cesium titanium sulfate dodecahydrate; anionic compounds such as the alkali metal chromates or dichromates, the ammonium chromates or dichromates, alkali metal aluminates, potassium titanate, sodium titanate, sodium vanadate, mmonium metavanadate, zinc dichromate, sodium zincate; and others.

In the combination additive of the invention the weight ratio of additive Agent No. 1 to additive Agent No. 2 is generally within the range of from 20:1 to 1:1, preferably within the range of from 12:1 to 2:1. Frequently, a weight ratio within the range of from 9:1 to 5:1 is more preferred.

The amount of the combination additives of the invention used in drilling fluids in accordance with the invention will vary from well to well depending upon conditions encountered in the drilling of the well, the characteristics of the particular drilling fluid being used, the formations being drilled, etc. For example, as the drilling of the well progresses and the well becomes deeper and temperatures in the well increase, or the drilling fluid becomes contaminated, more additive will usually be required because of said increased temperatures and/or contamination. While therefore the amount of additive used is not of the essence of the invention, it can be stated that the amount of said additive used will normally be within the range of 0.1 to 30, preferably 0.5 to 15, and more preferably 1 to 10, pounds per barrel of drilling fluid. However, it is within the scope of the invention to employ amounts of the additive which are outside said ranges. For example, the amount of additive used will always be an amount which is sufficient to reduce the water loss due to filtration and/or effect an improvement or reduction in the rheological properties of the drilling fluid such as a decrease in yield point, 10-minute gel, or shear strength. As used herein and in the claims, unless otherwise specified, the word "barrel" refers to a barrel of 42 standard U.S. gallons.

An important advantage of the combination additives of the invention is the ease with which they can be dispersed in the water phase of aqueous drilling fluids. Said combination additives can be incorporated in said drilling fluids by merely adding same to a circulating stream of the drilling fluid. The components of said combination additives are easily pulverized solids which can be added directly as such or dry blended together, to the jet hopper commonly employed in formulating drilling fluids. The incorporation of said combination additives into the drilling fluid can be either before or during the drilling of the well. Dry blending of additive Agent No. 1 and additive Agent No. 2 together in a proper weight ratio and then incorporating the resulting dry blend or mixture into a circulating stream of the drilling fluid is a presently preferred method for adding said additives to the drilling fluid. If desired, said additive agents can be added to the drilling fluid separately in dry form. Said additive Agent No. 1 and additive Agent No. 2 can also be dispersed in water separately and the resulting separate dispersions incorporated into the drilling fluid. However, it is pointed out that additive Agent No. 1 and additive Agent No. 2 should not be dispersed in water together prior to incorporating same into the drilling fluid. When said additive Agent No. 1 and said additive Agent No. 2 are dispersed in water together in the absence of finely divided solids such as clayey materials, a firm insoluble gel forms. Surprisingly, said gel is not formed when said additive agents are incorporated in the aqueous phase of a drilling fluid containing suspended finely divided solids such as clayey materials.

The following examples will serve to further illustrate the invention. In the following examples the additives of the invention were tested in seven different base muds. These base muds were all prepared in conventional manner. In general, the method of preparation of said base muds comprised preparing said muds in five-gallon batches in a suitable blending mill such as a Lear Blend-A Mill. The prepared muds were stirred for at least 30 minutes or more and then aged for three days or more prior to use. The compositions of said base muds are set forth in the following example and/or in the tables setting forth the results of said examples. In these examples sulfomethylated quebracho is sometimes referred to as "SMQ," for convenience. Similarly, the metal complex additives of the invention are sometimes referred to as "SMQ," for convenience. Similarly, the metal complex additixes of the invention are sometimes referred to as SMQ-metal complexes. For example, the iron complex of sulfomethylated quebracho is referred to as "SMQ-Fe," the copper complex as "SMQ-Cu," etc.

EXAMPLE I

A series of additive agents (Agent No. 1) was prepared for use in accordance with the invention. The amounts of reagents used and reaction conditions employed in preparing said additives are set forth in Table II below. All of said additive agents were prepared in the same general manner. Generally speaking, the method of preparation was as follows. The indicated amount of water was added to a suitably-sized reaction vessel. The indicated weight of sulfomethylating agent was then added to said water and was dissolved without the addition of external heat. Stoichiometric amounts of formaldehyde and sodium bisulfite were prereacted as described elsewhere herein and then added to said water. The indicated volume of sodium hydroxide solution (0.5 gram per milliliter) was then added to the solution with stirring. Heating was initiated and the ground quebracho in the amount indicated was added gradually with stirring, and the addition of heat. The average temperature maintained and the reaction time are shown under the heading "sulfomethylation reaction." The metal complexing agent(s), if used, was then added to the hot solution either dry or in solution as indicated in said Table II. The reaction vessel contents were then drum dried to recover the additive agent product.

Several larger scale batches of SMQ were also prepared. A composite of these batches is identified in Table II below as the sample used in Tables III–IX, inclusive, and XI. The following preparation is typical of said larger scale batches. Water in the amount of 275 gallons is added to a 2100-gallon reactor tank equipped with a double-bladed stirring means. A 37 weight percent formaldehyde solution in the amount of 110 gallons is then added to said water. The resulting solution is stirred and 1300 pounds of sodium bisulfite is added thereto over a period of approximately 45 minutes. During this period the temperature of the solution increases from about 65° F. to about 120° F. After the reaction between the sodium bisulfite and formaldehyde has been completed, as evidenced by a constant temperature, approximately 35 gallons of a 50 weight percent sodium hydroxide solution is added. The temperature of the solution will increase further to about 150° F. At this time 2250 pounds of quebracho are added slowly over a period of approximately 20 to 25 minutes. During this time the temperature increases to about 200° F. and the temperature is maintained within the range of 190 to 200° F. for approximately 2½ hours. The tank contents are vigorously agitated during the addition of the quebracho. The tank contents are circulated for approximately one hour and then passed to a drum drier for recovery of the reaction product, i.e., sulfomethylated quebracho (SMQ).

The above-described samples of additive agents (Agent No. 1), i.e., sulfomethylated quebracho and metal complexes thereof, were then used in preparing samples of drilling mud in accordance with the invention by adding various quantities of said additive agents (and agent No. 2) to one or more of Base Mud Nos. 1 to 8. These drilling mud samples containing said additive agents were all prepared in a conventional manner. API Code RP–13B properties were then determined on said drilling mud samples with a model 35 Fann V–G multi-speed viscosimeter and filter presses. The procedure for determination of API Code RP–13B properties employing the Fann V–G viscosimeter is described by Chisholm and Kohen, Petroleum Engineer, 26 (4), B–87 to B–90 (April 1954). Shear strength tests were also run on a number of said drilling mud samples employing a Baroid high temperature aging cell or bomb. Briefly, this test comprises placing a sample of the mud to be evaluated in the test cell or bomb, closing the bomb, and placing same in a hot oil bath or hot air oven maintained at a uniform temperature. After the desired period of aging at the desired temperature, the bomb is cooled to a temperature below 150° F. and opened. A shear tube, made from stainless steel, is placed on the surface of the sample and sufficient gram weights, if necessary, are placed on the tube to start its downward motion. Unless too much weight has been placed on the tube, it will stop its downward motion at the point where the shear strength of the gelled sample against the surface of the tube is sufficient to support the applied weight. The length of the tube exposed above the sample is then measured. The shear strength in pounds per 100 square feet is obtained from a nomograph by utilizing the force, in grams, applied to the shear tube and the length of exposed tube after the tube reaches equilibrium. Further details of said test can be obtained from "Apparatus and Procedure for the Field Testing of Drilling Muds," pp. 900–25 and 900–26, Baroid Division, National Lead Co., P.O. Box 1675, Houston, Texas. See also "Measuring and Interpreting High Temperature Shear Strength of Drilling Fluids," Watkins and Nelson, vol. 198, pp. 213–218, Petroleum Transactions, AIME (1953).

The composition of said base muds, said drilling mud samples and the results of tests thereon are set forth in Tables II to XII below.

TABLE II.—PREPARATION SUMMARY: SULFOMETHYLATED QUEBRACHO AND METAL COMPLEXES THEREOF

| Additive Agent | For Table No. | Vo. H₂O, ml. | Weight NaSO₃CH₂OH, grams | Vol. NaOH, ml. | Weight Quebracho, grams | Sulfomethylation Reaction Time, Hr.: Min. | Sulfomethylation Reaction Avg. Temp., °F. | Species | Weight, grams | Vol. of Metal Salt Solution, ml. | Moles Metal per Monomer mol Quebracho |
|---|---|---|---|---|---|---|---|---|---|---|---|
| SMQ-Al | VIII, IX | 400 | 150 | 40 | 200 | 3:18 | 187 | Al₂(SO₄)₃.18H₂O | 178 | 500 | 5/6 |
| SMQ-Cr | IX | 400 | 150 | 40 | 200 | 2:54 | 185 | Cr₂(SO₄)₃.5H₂O | 129 | 400 | 5/6 |
| SMQ-Zn | IX | 400 | 150 | 40 | 200 | 2:54 | 185 | ZnSO₄.7H₂O | 154 | 500 | 5/6 |
| SMQ-Cu | VIII, IX | 1,200 | 450 | ᵃ 60 | 600 | 4:10 | 189 | CuSO₄.5H₂O | 402 | 800 | 5/6 |
| SMQ | VIII-X | 1,200 | 450 | 120 | 600 | 4:10 | 198 | | | | |
| SMQ | III–, VIII, IX, XI | See paragraph 2 of Example I. | | | | | | | | | |
| SMQ | X | 400 | 150 | 40 | 200 | 5:20 | 185 | | | | |
| SMQ-Cr | X | 2,000 | 150 | ᶜ 140 | 200 | 5:25 | 193 | Cr(NO₃)₃.9H₂O ᵇ | 173 | ᵈ 250 | |

ᵃ 60 grams of solid NaOH added.
ᵇ Precipitated as the hydroxide with excess NH₃. Chromium hydroxide filtered off and added to the SMQ solution.
ᶜ Added in two portions, 40 ml. after the NaSO₃CH₂OH was added and 100 ml. after the chromium hydroxide.
ᵈ Estimated.

TABLE III.—ADDITIVES IN BASE MUD NO. 1

[20 wt. percent kaolin and 4 wt. percent bentonite in water]

| Additive: | Base Mud | Run Number 1 | 2 | 3 | 4 | 5 |
|---|---|---|---|---|---|---|
| Agent No. 1 (SMQ), lbs./bbl. mud | 0 | 0 | a 6.0 | 6.0 | 6.0 | 6.0 |
| | | | $Na_2CrO_4 \cdot 4H_2O$ c | | | (b) |
| Agent No. 2, lbs./bbl. mud | 0 | 2.02 | 2.02 | 0 | 2.02 | 4.31 |
| Weight Ratio, No. 1/No. 2 | | | 2.97 | | 2.97 | 1.39 |
| Initial Properties: | | | | | | |
| Plastic Viscosity, cps | 17 | 15 | | 17 | 18 | 12 |
| Yield point, lbs./100 ft.² | 24 | 72 | | 12 | 6 | 0 |
| Initial gel, lbs./100 ft.² | 24 | 63 | | 13 | 4 | 1 |
| 10-min. gel, lbs./100 ft.² | 45 | 77 | | 21 | 10 | 1 |
| Water loss, ml./30 min | 11.9 | 14.0 | | 9.8 | 9.8 | 16.6 |
| pH | 8.0 | 8.0 | | 9.1 | 9.2 | 9.5 |
| After Aging Overnight at 176° F.: | | | | | | |
| Plastic Viscosity, cps | 18 | 16 | 18 | 18 | 25 | 11 |
| Yield point, lbs./100 ft.² | 27 | 79 | 3 | 16 | 7 | 2 |
| Initial gel, lbs./100 ft.² | 35 | 103 | 4 | 17 | 4 | 1 |
| 10-min. gel, lbs./100 ft.² | 52 | 157 | 10 | 27 | 5 | 2 |
| Water loss, ml./30 min | 11.8 | 13.3 | 9.6 | 8.9 | 8.2 | 15.3 |
| pH | 7.8 | 7.5 | 9.3 | 8.1 | 9.8 | 8.7 | a Added to aged sample from Run 1 and sample then retested.
b $Cr_2(SO_4)_3 \cdot K_2SO_4 \cdot 24H_2O$.
c All amounts selected to give 1 lb. of $CrO_4^-$ per bbl. of mud.

TABLE IV.—ADDITIVES IN BASE MUD NO. 2

[10 wt. percent kaolin, 5.5 wt. percent bentonite, and 11 wt. percent barite* in water]

| Additive: | Base Mud | Run Number 1 | 2 | 3 | 4 | 5 |
|---|---|---|---|---|---|---|
| Agent No. 1 (SMQ), lbs./bbl. mud | 0 | 0 | a 6.0 | 6.0 | 6.0 | 6.0 |
| | | | $Na_2CrO_4 \cdot 4H_2O$ c | | | (b) |
| Agent No. 2, lbs./bbl. mud | 0 | 2.02 | 2.02 | 0 | 2.02 | 4.31 |
| Weight Ratio, No. 1/No. 2 | | | 2.97 | | 2.97 | 1.39 |
| Initial Properties: | | | | | | |
| Plastic Viscosity, cps | 47 | 16 | | 47 | 46 | 42 |
| Yield point, lbs./100 ft.² | 72 | 165 | | 23 | 20 | 3 |
| Initial gel, lbs./100 ft.² | 70 | 120 | | 13 | 9 | 2 |
| 10-min. gel, lbs./100 ft.² | 109 | 164 | | 31 | 22 | 3 |
| Water loss, ml./30 min | 7.5 | 7.7 | | 6.8 | 6.0 | 10.4 |
| pH | 8.0 | 8.1 | | 9.4 | 9.3 | 9.3 |
| After Aging Overnight at 176° F.: | | | | | | |
| Plastic Viscosity, cps | 47 | 34 | 59 | 48 | 62 | 36 |
| Yield point, lbs./100 ft.² | 106 | 155 | 27 | 34 | 31 | 5 |
| Initial gel, lbs./100 ft.² | 103 | 130 | 10 | 21 | 7 | 2 |
| 10-min. gel, lbs./100 ft.² | 153 | 170 | 26 | 40 | 8 | 3 |
| Water loss, ml./30 min | 7.2 | 7.6 | 6.5 | 7.5 | 6.5 | 9.7 |
| pH | 7.9 | 7.7 | 9.3 | 8.4 | 9.5 | 8.6 | a Added to aged sample from Run 1 and sample then retested.
b $Cr_2(SO_4)_3 \cdot K_2SO_4 \cdot 24H_2O$.
c All amounts selected to give 1 lb. of $CrO_4^-$ per bbl. of mud.
*Commercial product from Baroid Division, National Lead Co.

TABLE V.—ADDITIVES IN BASE MUD NO. 3

[20 wt. percent kaolin and 4 wt. percent bentonite in water, plus sufficient barite* to give mud weight of 12.2 lbs./gal.]

| Additive: | Base Mud | Run Number 1 | 2 | 3 | 4 | 5 | 6 | 7 |
|---|---|---|---|---|---|---|---|---|
| Agent No. 1 (SMQ), lbs./bbl. mud | 0 | 0 | 0 | 0 | 4.0 | 4.0 | 4.0 | 4.0 |
| | | | | | $Na_2CrO_4 \cdot 4H_2O$ | | | |
| Agent No. 2, lbs./bbl. mud | 0 | 0.72 | 1.45 | 2.90 | 0 | 0.72 | 1.45 | 2.90 |
| Weight Ratio, No. 1/No. 2 | | | | | | 5.55 | 2.76 | 1.38 |
| Initial Properties: | | | | | | | | |
| Plastic Viscosity, cps | 43 | T | T | T | 48 | 45 | 44 | 44 |
| Yield point, lbs./100 ft.² | 53 | T | T | T | 18 | 13 | 12 | 10 |
| Initial gel, lbs./100 ft.² | 37 | T | T | T | 6 | 4 | 4 | 3 |
| 10-min. gel, lbs./100 ft.² | 70 | T | T | T | 22 | 16 | 14 | 11 |
| Water loss, ml./30 min | 8.4 | 9.9 | 10.4 | 16.0 | 7.0 | 7.0 | 7.2 | 7.2 |
| pH | 8.3 | 8.4 | 8.4 | 8.3 | 9.8 | 9.9 | 10.0 | 10.1 |
| After Aging Overnight at 176° F.: | | | | | | | | |
| Plastic Viscosity, cps | 45 | 46 | 43 | 26 | 48 | 52 | 49 | 48 |
| Yield point, lbs./100 ft.² | 99 | 144 | 200 | 172 | 27 | 16 | 14 | 9 |
| Initial gel, lbs./100 ft.² | 90 | 122 | 171 | 122 | 14 | 4 | 4 | 3 |
| 10-min. gel, lbs./100 ft.² | 153 | 160 | 240 | 133 | 36 | 5 | 5 | 4 |
| Water loss, ml./30 min | 8.5 | 10.0 | 10.2 | 11.8 | 6.2 | 6.6 | 6.6 | 6.8 |
| pH | 8.1 | 7.6 | 7.9 | 7.7 | 8.4 | 9.0 | 9.5 | 9.7 |

*Commercial product from Baroid Division, National Lead Co.
T = Too thick to measure.

TABLE VI.—ADDITIVES IN BASE MUD NO. 4

[60 lbs./bbl. of P65 Rotary Clay (an illitic clay) and 12 lbs./bbl. bentonite in water]

| | Base Mud | Run Number | | | | | | | |
|---|---|---|---|---|---|---|---|---|---|
| | | 1 | 2 | 3 | 4 | 5 | 6 | 7 | 8 |
| Additive: | | | | | | | | | |
| Agent No. 1 (SMQ), lbs./bbl. mud | 0 | 0 | a 6.0 | 6.0 | 6.0 | 0 | a 6.0 | 6.0 | 6.0 |
| | | | $Na_2CrO_4 \cdot 4H_2O$ | | | $Na_2Cr_2O_7 \cdot 2H_2O$ | | d | (b) |
| Agent No. 2, lbs./bbl. mud c | 0 | 2.02 | 2.02 | 0 | 2.02 | 1.38 | 1.38 | 1.38 | 4.31 |
| Weight Ratio, No. 1/No. 2 | | | 2.97 | | 2.97 | | 4.35 | 4.35 | 1.39 |
| Initial Properties: | | | | | | | | | |
| Plastic Viscosity, cps | 8 | 7 | | 7 | 11 | 7 | | 11 | 8 |
| Yield point, lbs./100 ft.² | 5 | 29 | | 11 | 6 | 37 | | 4 | 0 |
| Initial gel, lbs./100 ft.² | 3 | 33 | | 12 | 4 | 36 | | 2 | 0 |
| 10-min. gel, lbs./100 ft.² | 10 | 60 | | 26 | 13 | 52 | | 8 | 1 |
| Water loss, ml./30 min | 11.0 | 12.0 | | 9.2 | 9.2 | 14.5 | | 8.0 | 15.8 |
| pH | 8.7 | 8.4 | | 9.1 | 9.2 | 7.7 | | 9.3 | 9.5 |
| After Aging Overnight at 176° F.: | | | | | | | | | |
| Plastic Viscosity, cps | 9 | 8 | 8 | 8 | 9 | 7 | 8 | 9 | 8 |
| Yield point, lbs./100 ft.² | 7 | 26 | 10 | 12 | 1 | 36 | 6 | 1 | 0 |
| Initial gel, lbs./100 ft.² | 3 | 37 | 11 | 17 | 1 | 51 | 6 | 2 | 1 |
| 10-min. gel, lbs./100 ft.² | 18 | 65 | 23 | 23 | 2 | 72 | 18 | 2 | 1 |
| Water loss, ml./30 min | 11.2 | 11.9 | 9.7 | 9.4 | 8.3 | 14.4 | 10.4 | 7.7 | 15.2 |
| pH | 8.0 | 7.8 | 9.0 | 8.3 | 9.3 | 7.6 | 9.3 | 9.1 | 8.6 | a Added to aged sample from previous run (1 or 5) and sample then retested.
b $Cr_2(SO_4)_3 \cdot K_2SO_4 \cdot 24H_2O$.
c All amounts selected to give 1 lb. of $CrO_4^=$ per bbl. of mud.
d $Na_2Cr_2O_7 \cdot 2H_2O$

TABLE VII.—ADDITIVES IN BASE MUD NO. 5

[60 lbs./bbl. P95 Rotary Clay (an illitic clay) and 12 lbs./bbl. bentonite in water plus 6 lbs./bbl. lime a]

| | Base Mud | Run Number | | | | | | | |
|---|---|---|---|---|---|---|---|---|---|
| | | 1 | 2 | 3 | 4 | 5 | 6 | 7 | 8 |
| Additive: | | | | | | | | | |
| Agent No. 1 (SMQ), lbs./bbl. mud | 0 | 0 | b 6.0 | 6.0 | 6.0 | 2 | 4 | 6 | 10 |
| | | | $Na_2CrO_4 \cdot 4H_2O$ c | | | $Na_2Cr_2O_7 \cdot 2H_2O$ d | | | |
| Agent No. 2, lbs./bbl. mud | 0 | 2.02 | 2.02 | 0 | 2.02 | 0.64 | 0.64 | 0.64 | 0.64 |
| Weight Ratio, No. 1/No. 2 | | | 2.97 | | 2.97 | 3.12 | 6.25 | 9.4 | 15.6 |
| Initial Properties: | | | | | | | | | |
| Plastic Viscosity, cps | T | T | | 8 | 8 | 20 | 13 | 13 | 11 |
| Yield point, lbs./100 ft.² | T | T | | 1 | 3 | 173 | 16 | 1 | 3 |
| Initial gel, lbs./100 ft.² | T | T | | 1 | 2 | 80 | 36 | 1 | 2 |
| 10-min. gel, lbs./100 ft.² | T | T | | 1 | 3 | | 145 | 1 | 3 |
| Water loss, ml./30 min | | | | 6.0 | 4.3 | 23.6 | 12.3 | 6.0 | 3.4 |
| pH | 11.7 | 11.9 | | 11.0 | 11.2 | 12.1 | 12.4 | 12.1 | 11.7 |
| After Aging Overnight at 176° F.: | | | | | | | | | |
| Plastic Viscosity, cps | T | T | 25 | 8 | 7 | 7 | 9 | 9 | 8 |
| Yield point, lbs./100 ft.² | T | T | 15 | 3 | 2 | 7 | 1 | 1 | 1 |
| Initial gel, lbs./100 ft.² | T | T | 12 | 1 | 0 | 11 | 1 | 1 | 1 |
| 10-min. gel, lbs./100 ft.² | T | T | 63 | 8 | 0 | 46 | 1 | 1 | 1 |
| Water loss, ml./30 min | 19.6 | 23.5 | 6.5 | 9.2 | 8.4 | 13.0 | 11.7 | 7.2 | 5.4 |
| pH | 11.0 | 11.0 | 10.1 | 10.1 | 11.1 | | | | 11.6 | a Added after the Agents No. 1 and/or No. 2, except in the base mud sample.
b Added to aged sample from Run No. 1 and sample then retested.
c All amounts selected to give 1 lb. of $CrO_4^=$ per bbl. of mud.
d Actually added as $Na_2CrO_4 \cdot 4H_2O$. T=Too Thick to measure.

TABLE VIII.—ADDITIVES IN BASE MUD NO. 6

[6 wt. percent bentonite in water]

| | Base Mud | Run Number | | | | | | | | | |
|---|---|---|---|---|---|---|---|---|---|---|---|
| | | 1 | 2 | 3 | 4 | 5 | 6 | 7 | 8 | 9 | 10 |
| Additive: | | SMQ | | | | SMQ-Fe | | SMQ-Cu | | SMQ-Al | |
| Agent No. 1, lbs./bbl. mud | 0 | 2.5 | 5.0 | 10.0 | 5.0 | 10 | 10 | 10 | 10 | 10 | 10 |
| | | $Na_2Cr_2O_7 \cdot 2H_2O$ | | | | $Na_2Cr_2O_7 \cdot 2H_2O$ | | $Na_2Cr_2O_7 \cdot 2H_2O$ | | $Na_2Cr_2O_7 \cdot 2H_2O$ | |
| Agent No. 2, lbs./bbl. mud | 0 | 1 | 1 | 1 | 0 | 0 | 1 | 0 | 1 | 0 | 1 |
| Weight Ratio, No. 1/No. 2 | | 2.5 | 5.0 | 10.0 | | | 10 | | 10 | | 10 |
| After Aging 3 days at 350° F.: | | | | | | | | | | | |
| Plastic Viscosity, cps | 26 | 22 | 19 | 17 | 14 | 11 | 13 | 12 | 14 | 9 | 11 |
| Yield point, lbs./100 ft.² | 47 | 7 | 6 | 4 | 5 | 1 | 4 | 3 | 3 | 1 | 1 |
| Initial gel, lbs./100 ft.² | 12 | 2 | 1 | 3 | 2 | 1 | 1 | 2 | 1 | 3 | 2 |
| 10-min. gel, lbs./100 ft.² | 35 | 2 | 2 | 4 | 3 | 1 | 2 | 3 | 2 | 3 | 1 |
| Water loss, ml./30 min | 11.2 | 11.8 | 10.6 | 12.2 | 10.2 | 7.4 | 7.6 | 7.8 | 8.6 | 10.2 | 10.0 |
| pH | 8.4 | 9.1 | 9.0 | 8.8 | 8.5 | 8.3 | 8.4 | 8.1 | 7.2 | 8.3 | 8.4 |
| Shear Strength, lbs./100 ft.² | 380 | 310 | 200 | 95 | 360 | 67 | 16 | 70 | 44 | 18 | 0 |

TABLE IX.—ADDITIVES IN BASE MUD NO. 7

[20 wt. percent P95 Rotary Clay (an illitic clay) and 4 wt. percent bentonite in water, plus sufficient barite* to give mud weight of 12.2 lbs./gal.]

| | Base Mud | 1 | 2 | 3 | 4 | 5 | 6 | 7 | 8 | 9 | 10 |
|---|---|---|---|---|---|---|---|---|---|---|---|
| Additive: | | SMQ-Fe | | | | SMQ-Cu | | | | SMQ-Zn | |
| Agent No. 1, lbs./bbl. mud | 0 | 5 | 5 | 10 | 10 | 5 | 5 | 10 | 10 | 5 | 5 |
| | | $Na_2Cr_2O_7 \cdot 2H_2O$ | | | | $Na_2Cr_2O_7 \cdot H_2O$ | | | | $Na_2Cr_2O_7 \cdot 2H_2O$ | |
| Agent No. 2, lbs./bbl. mud | 0 | 0 | 0.25 | 0 | 0.5 | 0 | 2 | 0 | 2 | 0 | 0.25 |
| Weight ratio, No. 1/No. 2 | 0 | | 20 | | 20 | | 2.5 | | 5.0 | | 20 |
| After Aging 3 days at 405° F.: | | | | | | | | | | | |
| Plastic viscosity, cps | 58 | 40 | 37 | 33 | 35 | 49 | 42 | 51 | 49 | 40 | 41 |
| Yield point, lbs./100 ft.² | 140 | 180 | 101 | 40 | 23 | 41 | 12 | 20 | 12 | 50 | 37 |
| Initial gel, lbs./100 ft.² | 102 | 198 | 115 | 23 | 8 | 8 | 3 | 6 | 4 | 11 | 6 |
| 10-min. gel, lbs./100 ft.² | 284 | 300+ | 237 | 170 | 89 | 124 | 6 | 23 | 10 | 195 | 158 |
| Water loss, ml./30 min | 7.0 | 12.2 | 9.4 | 8.8 | 8.2 | 7.4 | 6.4 | 5.0 | 4.4 | 8.0 | 8.2 |
| pH | 7.8 | 7.7 | 8.0 | 8.5 | 8.6 | 8.3 | 8.9 | 8.4 | 8.9 | 9.1 | 8.6 |
| Shear Strength, lbs./100 ft.² | 1,400 | 1,150 | 1,050 | 650 | 650 | 1,100 | 450 | 575 | 450 | 900 | 850 |

| | 11 | 12 | 13 | 14 | 15 | 16 | 17 | 18 | 19 | 20 | 21 |
|---|---|---|---|---|---|---|---|---|---|---|---|
| Additive: | SMQ-Al | | SMQ-Cr | | | | SMQ | | | | |
| Agent No. 1, lbs./bbl. mud | 5 | 5 | 5 | 5 | 10 | 10 | 5 | 5 | 5 | 5 | 5 |
| | $Na_2Cr_2O_7 \cdot 2H_2O$ | | $Na_2Cr_2O_7 \cdot 2H_2O$ | | | | $Na_2Cr_2O_7 \cdot 2H_2O$ | | | | |
| Agent No. 2, lbs./bbl. mud | 0 | 0.25 | 0 | 0.5 | 0 | 0.5 | 0 | 0.25 | 0.5 | 1.0 | 2.0 |
| Weight ratio, No. 1/No. 2 | | 20 | | 10 | | 20 | | 20 | 10 | 5 | 2.5 |
| After Aging 3 days at 405° F.: | | | | | | | | | | | |
| Plastic viscosity, cps | 27 | 30 | 38 | 37 | 43 | 42 | 48 | 47 | 46 | 43 | 40 |
| Yield point, lbs./100 ft.² | 75 | 44 | 15 | 14 | 10 | 10 | 22 | 23 | 19 | 15 | 11 |
| Initial gel, lbs./100 ft.² | 64 | 34 | 4 | 3 | 3 | 4 | 4 | 4 | 4 | 4 | 3 |
| 10-min. gel, lbs./100 ft.² | 221 | 142 | 32 | 7 | 9 | 6 | 13 | 10 | 8 | 4 | 4 |
| Water loss, ml./30 min | 9.0 | 8.2 | 6.6 | 7.2 | 6.0 | 5.2 | 6.8 | 6.4 | 6.4 | 6.8 | 6.0 |
| pH | 7.8 | 8.1 | | 8.7 | 8.6 | 8.7 | 8.8 | 8.7 | 8.8 | 8.9 | 9.0 |
| Shear Strength, lbs./100 ft.² | 1,150 | 850 | 700 | 450 | 550 | 260 | 1,000 | 1,050 | 800 | 650 | 600 |

*Commercial product from Baroid Division, National Lead Co.
T=Too thick to measure.

TABLE X.—ADDITIVES IN BASE MUD NO. 3

[20 wt. percent kaolin and 4 wt. percent bentonite in water, plus sufficient barites to give mud weight of 12.2 lbs./gal.]

| | Base Mud | 1 | 2 | 3 |
|---|---|---|---|---|
| Additive: | | SMQ | | SMQ-Cr. |
| Agent No. 1, lbs./bbl. mud | 0 | 10 | 8 | 10 |
| | | $Na_2CrO_4 \cdot 4H_2O$ | | |
| Agent No. 2, lbs./bbl. mud | 0 | 0 | 2 | 0 |
| Weight Ratio, No. 1/No. 2 | 0 | | 4 | |
| Initial Properties: | | | | |
| Plastic viscosity, cps | 35 | 31 | 31 | 45 |
| Yield point, lbs./100 ft.² | 41 | 18 | 18 | 13 |
| Initial gel, lbs./100 ft.² | 34 | 11 | 8 | 4 |
| 10-min. gel, lbs./100 ft.² | 76 | 17 | 11 | |
| Water loss, ml./30 min | 9.5 | 7.9 | 7.0 | 3.3 |
| pH | 8.1 | 8.6 | 9.0 | 9.5 |
| After Aging 3 days at 350° F.: | | | | |
| Plastic viscosity, cps | 33 | 64 | 57 | 58 |
| Yield point, lbs./100 ft.² | 72 | 25 | 9 | 18 |
| Initial gel, lbs./100 ft.² | 79 | 5 | 3 | 2 |
| 10-min. gel, lbs./100 ft.² | 137 | 11 | 4 | 4 |
| Water loss, ml./30 min | 11.1 | 3.8 | 8.0 | 7.7 |
| pH | 8.1 | 8.6 | 8.8 | 8.3 |
| Shear Strength, lbs./100 ft.² | 470 | 160 | 85 | 310 |

Referring to Tables III–VII, inclusive, the data there set forth show the results of test runs using additive Agent No. 1 and additive Agent No. 2 separately and in combination in five different base muds. Said data show that the combination additives of the invention are highly effective dispersing or thinning agents for drilling muds, regardless of the source of the metal in additive Agent No. 2, i.e., said metal can be present in either cationic or anionic form.

Said data in Tables III–VII also illustrate the synergistic effect which is obtained when additive Agent No. 1 and additive Agent No. 2 are used in combination in the combination additives of the invention. It will be noted that in all of the runs wherein additive Agent No. 2 only was used the mud was thickened, even after aging. In Base Muds No. 3 and No. 5 this thickening was so great that the rheological properties of the drilling mud could not be determined. While additive Agent No. 1 does exhibit some dispersing or thinning action when used alone, the results of the test runs wherein said additive Agents No. 1 and No. 2 were used in combination show that a remarkably increased thinning action is obtained. Since additive Agent No. 2 normally causes a thickening of the drilling fluids, a synergistic action must be occurring when said additive Agents No. 1 and No. 2 are used together in combination.

While it is not intended to limit the invention by any theory as to the actions which take place when said additive agents are added to a drilling mud, it is presently believed that the thickening action by additive Agent No. 2 when used alone is the result of some reaction, either physical or chemical, between the clay in the drilling fluid and said additive Agent No. 2. In Run 2 of Table III, Run 2 of Table IV, Runs 2 and 6 of Table VI, and Run 2 of Table VII, additive Agent No. 1 was added to the aged sample of drilling mud from the previous run which contained only additive Agent No. 2. Said aged sample was then retested. It will be noted that the thinning action obtained was intermediate between the results obtained in the runs where the drilling mud contained only additive Agent No. 1 and the runs where the drilling mud contained additive Agents No. 1 and No. 2 together in combination. It is presently believed that these results indicate that when said additive Agents No. 1 and No. 2 are used together in combination some synergistic action, perhaps between all three of (a) the clay, (b) the additive Agent No. 1, and (c) the additive Agent No. 2, is occurring to remarkably increase the thinning action of said additive Agent No. 1. This was certainly surprising in view of the fact that additive Agent No. 2 normally thickens the drilling muds.

Referring to Tables VIII and IX, the results there set forth show that a synergistic action is occurring between additive Agent No. 1 and additive Agent No. 2 when additive Agent No. 1 is a metal complex of a sulfoalkylated tannin. These results are outstanding because the aging tests set forth in Tables VIII and IX, being carried out for three days at 350 and 405° F., respectively, represent very severe tests of the gelation characteristics of the drilling fluid.

TABLE XI.—ADDITIVES IN BASE MUD NO. 3

[20 wt. percent kaolin and 4 wt. percent bentonite in water, plus sufficient barite* to give mud weight of 12.2 lbs./gal.]

| | | Run Number | | | | | | |
|---|---|---|---|---|---|---|---|---|
| | Base Mud | 1 | 2 | 3 | 4 | 5 | 6 | 7 |
| Additive: | | | | | | | | |
| Agent No. 1 (SMQ), lbs./bbl. mud | 0 | 5 | 5 | 5 | 5 | 5 | 5 | 5 |
| | | | (b) | (c) | (d) | (e) | (f) | (g) |
| Agent No. 2, lbs./bbl. mud | 0 | 0 | 1 | 1 | 1 | 1 | 1 | 1 |
| Weight Ratio, No. 1/No. 2 | | | 5 | 5 | 5 | 5 | 5 | 5 |
| Initial Properties: | | | | | | | | |
| Plastic Viscosity, cps | 39 | 33 | 42 | 52 | 27 | 50 | 35 | 48 |
| Yield point, lbs./100 ft.$^2$ | 99 | 29 | 13 | 18 | 5 | 18 | 5 | 13 |
| Initial gel, lbs./100 ft.$^2$ | 90 | 26 | 5 | 5 | 4 | 14 | 3 | 5 |
| 10-min. gel, lbs./100 ft.$^2$ | 139 | 41 | 6 | 6 | 18 | 37 | 7 | 6 |
| pH | 7.9 | 7.7 | 7.9 | 9.2 | 7.3 | 7.2 | 7.2 | 8.6 |
| After Aging overnight at 176° F.: | | | | | | | | |
| Plastic Viscosity, cps | 58 | 48 | 57 | 50 | 46 | 43 | 42 | 49 |
| Yield point, lbs./100 ft.$^2$ | 102 | 21 | 23 | 19 | 13 | 11 | 7 | 9 |
| Initial gel, lbs./100 ft.$^2$ | 59 | 10 | 5 | 6 | 4 | 4 | 4 | 4 |
| 10-min. gel, lbs./100 ft.$^2$ | 134 | 32 | 7 | 7 | 7 | 7 | 7 | 6 |
| Water loss, ml./30 min | 7.8 | 6.8 | 6.0 | 7.0 | 7.2 | 6.7 | 7.4 | 7.5 |
| pH $^a$ | 9.2 | 9.3 | 10.1 | 10.0 | 9.9 | 9.8 | 10.1 | 9.8 |

$^a$ pH of samples adjusted to approximately 11 by addition of NaOH solution before aging.
$^b$ $NaCr_2O_7 \cdot 2H_2O$.
$^c$ $NaAlO_2$.
$^d$ $ZnCl_2$.
$^e$ $Zn(NO_3)_2 \cdot XH_2O$.
$^f$ $AlCl_3 \cdot 6H_2O$.
$^g$ $KMnO_4$.
*Commercial product from Baroid Division, National Lead Co.

TABLE XIII.—ADDITIVES IN BASE MUD NO. 8

[20 wt. percent of P95 Rotary Clay (an illitic clay) and 4 wt. percent of bentonite in water plus 2 lbs./bbl. of Portland cement as contaminant $^a$]

| | | Run Number | | | | | |
|---|---|---|---|---|---|---|---|
| | Base Mud | 1 | 2 | 3 | 4 | 5 | Base Mud* |
| Additive: | | | | | | | |
| Agent No. 1 (SMQ), lbs./bbl. mud | 0 | 5.0 | 5.0 | 5.0 | 5.0 | 5.0 | 0 |
| | | | $Na_2Cr_2O_7 \cdot 2H_2O$ | | | | |
| Agent No. 2, lbs./bbl. mud | 0 | 0 | 0.5 | 1.0 | 0 | 1.0 | 0 |
| Weight Ratio, No. 1/No. 2 | | | 10.0 | 5.0 | | 5.0 | |
| Initial Properties: | | | | | | | |
| Plastic Viscosity, cps | T | 41 | 33 | 35 | 44 | 47 | T |
| Yield point, lbs./100 ft.$^2$ | T | 12 | 6 | 6 | 24 | 11 | T |
| Initial gel, lbs./100 ft.$^2$ | T | 4 | 3 | 3 | 5 | 4 | T |
| 10-min. gel, lbs./100 ft.$^2$ | T | 18 | 6 | 6 | 34 | 12 | T |
| pH | T | 11.8 | 11.6 | 11.6 | 11.5 | 11.5 | T |
| | | | | | Aged 1 day at 176° F. | | |
| After Aging 3 days at 350° F.: | | | | | | | |
| Plastic Viscosity, cps | 14 | 36 | 29 | 29 | 48 | 40 | |
| Yield point, lbs./100 ft.$^2$ | 18 | 9 | 7 | 7 | 24 | 19 | |
| Initial gel, lbs./100 ft.$^2$ | 7 | 3 | 4 | 2 | 5 | 4 | |
| 10-min. gel, lbs./100 ft.$^2$ | 57 | 5 | 4 | 3 | 31 | 4 | |
| Water loss, ml./30 min | 14.2 | 6.4 | 6.0 | 5.6 | 4.2 | 4.2 | |
| pH | 8.9 | 9.0 | 9.1 | 9.3 | 11.4 | 11.6 | |
| Shear Strength, lbs./100 ft.$^2$ | 1,150 | 550 | 320 | 170 | | | |

$^a$ Added to mud after Agent No. 1 or No. 2 except in base mud sample.
* Base mud for Runs 4 and 5, also contains sufficient commercial barite to give mud wt. of 12.2 lbs./gal.
T = Too thick to measure.

Referring to Table X, the results there set forth show that the combination additive of the invention composed of SMQ as additive Agent No. 1 and sodium chromate as additive Agent No. 2 is superior to the additive agent SMQ-Cr formed by precomplexing SMQ and chromium. It is presently believed that these results show that the action which occurs when the combination additives of the invention are used in drilling fluids is different from the action which occurs when said precomplexed additive SMQ-Cr is added to a drilling fluid.

Referring to Table XI, the results there set forth illustrate the effectiveness of various other combination additives of the invention. It will be noted that in all of the runs the additive Agent No. 2 markedly increased the effectiveness of the additive Agent No. 1.

Referring to Table XII, the results there set forth illustrate the effectiveness of the combination additives of the invention in the presence of cement contamination. The data show that the combination additive of SMQ and sodium dichromate, one of the preferred additives of the invention, is a very effective thinning agent and water loss control agent, even in the presence of cement contamination. Similar results have been observed with other combination additives prepared in accordance with this invention. Likewise, the results of tests, not included here, show that the combination additives of the invention are also effective in the presence of salt contamination.

The combination additives of the invention can be used in a wide variety of aqueous drilling fluids, e.g., water base drilling fluids and oil-in-water emulsion drilling fluids. In some wells, particularly where hard limestone formations containing no shale or clay are being drilled, the drilling fluid can be water containing only a very small amount of finely divided inorganic solids such as clay solids. Many times, the drilling of a well is started with water as the drilling fluid. As the drilling progresses and shales or clay formations are penetrated, the circulating water will pick up natural clays and become what is commonly referred to as a drilling mud or drilling fluid. In such instances, the natural clays can constitute as much as 40 percent by weight of the drilling fluid. More frequently, however, it is desirable to prepare a drilling fluid which is to be used in the drilling by mixing a clayey material such as a natural clay or bentonite with water. If a drilling fluid is thus prepared, the concentration of the clayey material is usually lower, generally constituting from about 1 to about 25 weight percent of the entire composition. Thus, the drilling fluids of the invention in which the combination additives of the invention are utilized can contain only relatively small amounts of said clayey materials or can contain said clayey materials in amounts up to about 40 weight percent of the entire composition.

The finely divided inorganic solids used in the drilling fluids increase the viscosity and afford plastering properties to said fluids by aiding the formation of a filter cake on the wall of the bore hole and thus aid in reducing fluid loss to the formations penetrated by said bore hole. The finely divided inorganic solids used in the practice of the invention should be insoluble in the oil phase as well as insoluble in the water phase so that they will remain undissolved over long periods of time. Examples of finely divided solids suitable for use in the practice of the invention include, among others, the following: bentonite, ground limestone, barites, ground oyster shells, diatomaceous earth, fuller's earth, kaolin, attapulgite, McCracken clay, and other native and/or treated clays. Mixtures of two or more of said finely divided solids can also be used. Some of said materials such as barites and limestone are used primarily as weighting agents. All of said materials are preferably ground until at least about 90 percent will pass through a 325-mesh screen.

A preferred drilling fluid for some drilling operations is an oil-in-water emulsion drilling fluid. These drilling fluids can also contain clay or clayey materials in concentrations ranging from small amounts up to about 40 weight percent. Said oil-in-water emulsion drilling fluids are usually distinguished from water base drilling fluids by their content of from 5 to 40, preferably 5 to 25, weight percent of oil. However, there is really no sharp dividing line between water base drilling fluids and oil-in-water emulsion drilling fluids because water forms the continuous phase in both. Both are frequently referred to as aqueous drilling fluids. Thus, herein and in the claims, unless otherwise specified, the term "aqueous drilling fluid" is used generically and refers to both water base drilling fluids and oil-in-water emulsion drilling fluids.

In an oil-in-water emulsion drilling fluid the principal value of the oil is as an aid in controlling the density of the drilling fluid and its fluid loss properties. Oils which can be used in the practice of the invention are usually petroleum oils, although other oleaginous materials such as vegetable and animal oils can be used, though seldom with economic advantage. The oils in any event should contain at least some material boiling above the gasoline boiling range, i.e., above about 400° F. at atmospheric pressure. Oils with too high a content of highly volatile hydrocarbons in the gasoline boiling range are undesirable because of the danger of fire, and because of the low viscosity. It is preferred that the oil have a flash point about 140° F. Examples of suitable oils which can be employed in the practice of the invention include, among others, the following: topped crude oil, gas oils, kerosene, diesel fuels, heavy alkylates, fractions of heavy alkylates, and the like. The more preferred oils are predominantly paraffinic in character since these are less detrimental to rubber components in pumps, lines, etc. It is preferred that the oil have a gravity within the range of 15–40° API.

The aqueous drilling fluids of the invention, both the water base drilling fluids and the oil-in-water emulsion drilling fluids, can contain other additives when required to adjust the properties of the drilling fluids in accordance with conventional practice. Thus, it will be understood that other additives can be added to the drilling fluids of this invention without departing from the scope of the invention. Special materials are oftentimes added to drilling fluids for particular purposes, and such additional materials can be employed in the drilling fluids of this invention, providing a usual and conventional test indicates a lack of obvious adverse reactions, and such additional additives are applicable in the drilling fluids of this invention with few, if any, exceptions.

While certain embodiments of the invention have been described for illustrative purposes, the invention obviously is not limited thereto. Various other modifications will be apparent to those skilled in the art in view of this disclosure. Such modifications are within the spirit and scope of the invention.

We claim:

1. An aqueous drilling fluid comprising water, and sufficient finely divided solids to form a filter cake on the wall of the well, and to which there has been added: a first agent consisting essentially of a sulfoalkylated tannin in which the tannin molecule is alkylated with at least one —C(R)$_2$—SO$_3$M side chain wherein each R is selected from the group consisting of hydrogen and alkyl radicals containing from 1 to 5 carbon atoms, and M is selected from the group consisting of ammonium, and the alkali metals, and said tannin is selected from the group consisting of the gallotannins and the flavotannins; and a second agent selected from the group consisting of the water-soluble inorganic compounds of chromium, and mixtures thereof, wherein the chromium can be present in the cation or anion portion of the molecule; the weight ratio of said first agent to said second agent being within the range of from 20:1 to 1:1; and the total amount of said first agent and said second agent added to said drilling fluid being an amount sufficient to reduce at least one of (a) the water loss due to filtration through said filter cake, (b) the yield point, and (c) the 10-minute gel of said drilling fluid but insufficient to increase the viscosity of said drilling fluid to such an extent that it cannot be circulated.

2. An aqueous drilling fluid according to claim 1 wherein: said first agent is a sulfomethylated quebracho; said second agent is selected from the group consisting of ammonium chromate, ammonium dichromate, sodium chromate, sodium dichromate, potassium chromate, potassium dichromate, and mixtures thereof; and the total amounts of said first agent and said second agent is within the range of from 0.1 to 30 pounds per barrel of said drilling fluid.

3. An aqueous drilling fluid comprising water, and sufficient finely divided solids to form a filter cake on the wall of the well, and to which there has been added: a first agent consisting essentially of sulfomethylated quebracho; and a second agent selected from the group consisting of the water-soluble inorganic compounds of chromium, and mixtures thereof, wherein the chromium can be present in the cation or anion portion of the molecule; the weight ratio of said first agent to said second agent being within the range of from 20:1 to 1:1; and the total amount of said first agent and said second agent added to said drilling fluid being an amount sufficient to reduce at least one of (a) the water loss due to filtration through said filter cake, (b) the yield point, and (c) the 10-minute gel of said drilling fluid but insufficient to increase the viscosity of said drilling fluid to such an extent that it cannot be circulated.

4. A drilling fluid in accordance with claim 3 wherein said second agent is sodium dichromate.

5. A drilling fluid in accordance with claim 3 wherein said second agent is chromium chloride.

6. In a process for the drilling of a well with well drilling tools wherein a drilling fluid is circulated in said well in contact with the wall thereof, the improvement comprising circulating in said well as said drilling fluid an aqueous drilling fluid comprising water, and sufficient finely divided solids to form a filter cake on the wall of the well, and to which drilling fluid there has been added: a first agent consisting essentially of a sulfoalkylated tannin in which the tannin molecule is alkylated with at least one —C(R)$_2$—SO$_3$M side chain wherein each R is selected from the group consisting of hydrogen and alkyl radicals containing from 1 to 5 carbon atoms, and M is selected from the group consisting of ammonium, and the alkali metals, and said tannin is selected from the group consisting of the gallotannins and the flavotannins; and a second agent selected from the group consisting of the water-soluble inorganic compounds of chromium, and mixtures thereof, wherein the chromium can be present in the cation or anion portion of the molecule; the weight ratio of said first agent to said second agent being within the range of from 20:1 to 1:1; and the total amount of said first agent and said second agent added to said drilling fluid being an amount sufficient to reduce at least one of (a) the water loss due to filtration through said filter cake, (b) the yield point, and (c) the 10-minute gel of said drilling fluid but insufficient to increase the viscosity of said drilling fluid to such an extent that it cannot be circulated.

7. A process according to claim 6 wherein the total amount of said first agent and said second agent added to said drilling fluid is within the range of from 0.1 to 30 pounds per barrel of said drilling fluid; and said second agent added to said drilling fluid is selected from the group consisting of ammonium chromate, ammonium dichromate, sodium chromate, sodium dichromate, potassium chromate, potassium dichromate, and mixtures thereof.

8. A process according to claim 7 wherein: said first agent added to said drilling fluid is a sulfomethylated quebracho; said second agent is sodium dichromate; and the weight ratio of said first agent to said second agent is within the range of from 12:1 to 2:1.

9. In a process for the drilling of a well with well drilling tools wherein a drilling fluid is circulated in said well in contact with the wall thereof, the improvement comprising circulating in said well as said drilling fluid an aqueous drilling fluid comprising water, and sufficient finely divided solids to form a filter cake on the wall of the well, and to which drilling fluid there has been added: a first agent consisting essentially of sulfomethylated quebracho; and a second agent selected from the group consisting of the water-soluble inorganic compounds of chromium, and mixtures thereof, wherein the chromium can be present in the cation or anion portion of the molecule; the weight ratio of said first agent to said second agent being within the range of from 20:1 to 1:1; and the total amount of said first agent and said second agent added to said drilling fluid being an amount sufficient to reduce at least one of (a) the water loss due to filtration through said filter cake, (b) the yield point, and (c) the 10-minute gel of said drilling fluid but insufficient to increase the viscosity of said drilling fluid to such an extent that it cannot be circulated.

10. A process in accordance with claim 9 wherein said second agent is sodium dichromate.

11. A process in accordance with claim 9 wherein said second agent is chromium chloride.

12. A drilling fluid additive consisting essentially of a mixture of: a first agent consisting essentially of a sulfoalkylated tannin in which the tannin molecule is alkylated with at least one —C(R)$_2$—SO$_3$M side chain wherein each R is selected from the group consisting of hydrogen and alkyl radicals containing from 1 to 5 carbon atoms, and M is selected from the group consisting of ammonium, and the alkali metals, and said tannin is selected from the group consisting of the gallotannins and the flavotannins; and a second agent selected from the group consisting of the water-soluble inorganic compounds of chromium, and mixtures thereof, wherein the chromium can be present in the cation or anion portion of the molecule; the weight ratio of said first agent to said second agent in said additive being within the range of from 20:1 to 1:1.

13. A drilling fluid additive according to claim 12 wherein: said first agent is a sulfomethylated quebracho; and said second agent is selected from the group consisting of ammonium chromate, ammonium dichromate, sodium chromate, sodium dichromate, potassium chromate, potassium dichromate, and mixtures thereof.

14. A drilling fluid additive according to claim 13 wherein: the weight ratio of said first agent to said second agent is within the range of from 12:1 to 2:1; and said second agent is sodium dichromate.

15. A drilling fluid additive consisting essentially of a mixture of: a first agent consisting essentially of sulfomethylated quebracho; and a second agent selected from the group consisting of the water-soluble inorganic compounds of chromium, and mixtures thereof, wherein the chromium can be present in the cation or anion portion of the molecule; the weight ratio of said first agent to said second agent in said additive being within the range of from 20:1 to 1:1.

16. A drilling fluid additive consisting essentially of a mixture of sulfomethylated quebracho and sodium dichromate wherein the weight ratio of said sulfomethylated quebracho to said sodium dichromate is within the range of from 20:1 to 1:1.

17. A drilling fluid additive consisting essentially of a mixture of sulfomethylated quebracho and chromium chloride wherein the weight ratio of said sulfomethylated quebracho to said chromium chloride is within the range of from 20:1 to 1:1.

18. A drilling fluid additive consisting essentially of a mixture of sulfomethylated quebracho and chromium nitrate wherein the weight ratio of said sulfomethylated quebracho to said chromium nitrate is within the range of from 20:1 to 1:1.

19. A drilling fluid additive consisting essentially of a mixture of sulfomethylated quebracho and chromium sulfate wherein the weight ratio of said sulfomethylated quebracho to chromium sulfate is within the range of from 20:1 to 1:1.

References Cited

UNITED STATES PATENTS

| | | | |
|---|---|---|---|
| 2,331,281 | 10/1943 | Wayne | 252—8.5 |
| 2,605,221 | 7/1952 | Hoeppel | 252—8.5 |
| 3,177,141 | 4/1965 | Brukner et al. | 252—8.5 |
| 3,311,553 | 3/1967 | Weiss et al. | 252—8.5 |
| 3,344,063 | 9/1967 | Stratton | 252—8.5 |

HERBERT B. GUYNN, Primary Examiner